United States Patent
Niebrugge

[19]

[11] Patent Number: 6,042,452
[45] Date of Patent: Mar. 28, 2000

[54] FOOTREST AND TURKEY CALL DEVICE

[76] Inventor: Gary L. Niebrugge, R#2 Box 156, Watson, Ill. 62473

[21] Appl. No.: 09/062,619

[22] Filed: Apr. 20, 1998

[51] Int. Cl.[7] .............................. A63H 5/00; A47C 16/00
[52] U.S. Cl. ...................... 446/397; 446/418; 297/423.44
[58] Field of Search .................................. 446/397, 404, 446/418, 420, 81; 297/423.44, 423.45, 423.46, 344.12

[56] References Cited

U.S. PATENT DOCUMENTS

| | | | |
|---|---|---|---|
| 3,007,280 | 11/1961 | Berberich | 446/397 |
| 3,793,767 | 2/1974 | Pulley | 446/397 |
| 4,836,822 | 6/1989 | Finley et al. | 446/397 |
| 4,955,845 | 9/1990 | Piper | 446/397 |
| 5,402,102 | 3/1995 | Lachance | 340/404.1 |
| 5,503,585 | 4/1996 | Heineman | 446/397 |

*Primary Examiner*—Sam Rimell
*Assistant Examiner*—Laura Fossum

[57] ABSTRACT

In its broadest context, the present invention includes a base plate to which a footrest is pivotally secured. A pair of adjustment rods are employed in supporting the footrest. Additionally, a activation pedal is pivotally secured to the side of the footrest. The activation pedal, in turn, is interconnected to a turkey call device. The activation pedal can be rotated with the foot in order to activate the turkey call. The various components of the present invention, and the manner in which they interrelate, will be described in greater detail hereinafter.

3 Claims, 2 Drawing Sheets

FOOTREST AND TURKEY CALL DEVICE

BACKGROUND OF THE INVENTION

1. Field of the Invention

The present invention relates to a turkey call and more particularly pertains to such a call which can also be employed as a footrest.

2. Description of the Prior Art

The use of a turkey calls is known in the prior art. More specifically, such turkey calls are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,201,568 to Christensen discloses a foot rest device. U.S. Pat. No. 5,419,618 to Hatcher discloses an ergonomic footrest device. U.S. Pat. No. 4,988,325 to Alderson discloses a turkey call device. U.S. Pat. No. 5,294,180 to Grimm discloses an adjustable foot rest device. U.S. Design Pat. No. 313,521 to Hassel discloses an adjustable foot rest device. U.S. Pat. No. 4,606,733 to Willis discloses a slate box Turkey call device.

In this respect, the turkey call of the present invention substantially departs from the conventional concepts and designs of the prior art, and in so doing provides an apparatus primarily developed for the purpose of enabling a user to control a turkey call with their foot.

Therefore, it can be appreciated that there exists a continuing need for improved turkey calls. In this regard, the present invention substantially fulfills this need.

SUMMARY OF THE INVENTION

In view of the foregoing disadvantages inherent in the known types of turkey calls now present in the prior art, the present invention provides a turkey call which functions as a foot rest. As such, the general purpose of the present invention, which will be described subsequently in greater detail, is to enable a user to control turkey call sounds with his foot.

To attain this, the present invention essentially comprises a base plate to which a footrest is pivotally secured. A pair of adjustment rods are employed in supporting the footrest. Additionally, a activation pedal is pivotally secured to the side of the footrest. the activation pedal, in turn, is interconnected to a turkey call device. The activation pedal can be rotated with the foot in order to activate the turkey call. The various components of the present invention, and the manner in which they interrelate, will be described in greater detail hereinafter.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved footrest and turkey call device. The device includes a base having a rearward edge, a forward edge and an intermediate extent therebetween. Two side edges extend between the rearward and the forward edges, and a cutout heel portion is formed at the rearward edge of the base. A pair of ground stakes are included with each of the stakes being pivotally secured to the rearward edge of the base. The device further includes a footrest having a rearward edge, a forward edge and side edges extending therebetween. The rearward edge of the footrest is pivotally coupled to the rearward edge of the base. Additionally, a pair of adjustment rods, with each of the rods being pivotally coupled to an intermediate extend of a side edge of the base, are each adapted to engage a pin located at an intermediate extent of the side edge of the footrest. Each of the adjustment rods includes a number of recesses for accepting a corresponding pin such that the angular position of the footrest may be adjusted. The device further includes a turkey call activation pedal having a rearward end, a forward end and an intermediate extent therebetween. The intermediate extent of the activation pedal is pivotally coupled to a side edge of the footrest approximate to the forward edge. The turkey call generating device has a forward portion from which sound emanates and a rearward edge with an associated activation switch for use in producing a turkey call sound. A length of cord interconnects the activation switch and the rearward end of the activation pedal such that forward rotation of the activation pedal causes the outward movement of the activation switch and the production of a turkey sound.

It is another object of the present invention to provide a foot rest and turkey call which can be secured into the ground.

It is a further object of the present invention to provide a turkey call and foot rest which is collapsible.

An even further object of the present invention is to provide a turkey call and foot rest device which is susceptible of a low cost of manufacture with regard to both materials and labor, and which accordingly is then susceptible of low prices of sale to the consuming public, thereby making such device economically available to the buying public.

Still another object of the present invention is to create turkey call and foot rest device which is easily transportable.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
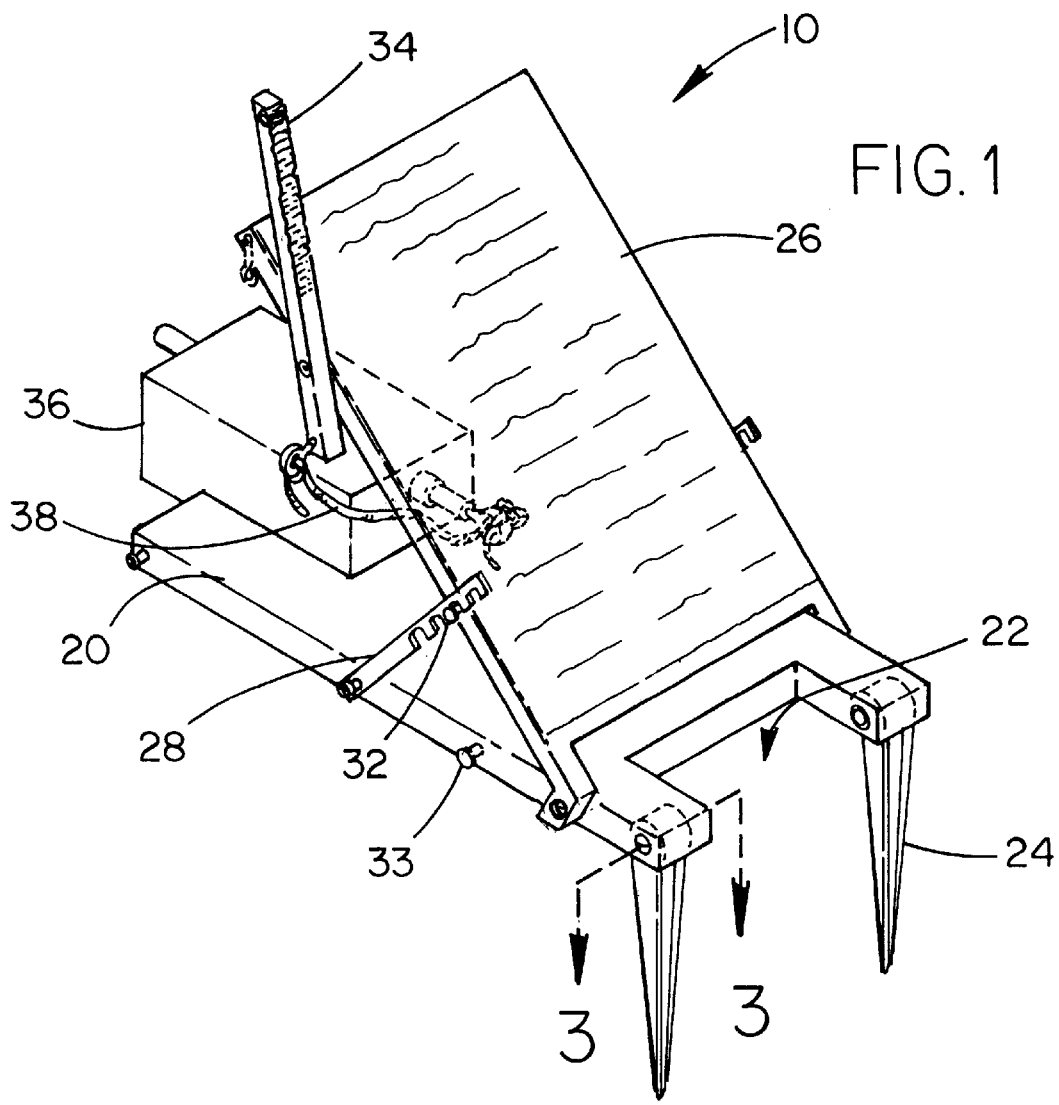
FIG. 1 is perspective view of the device ready for use.
Figure 2:
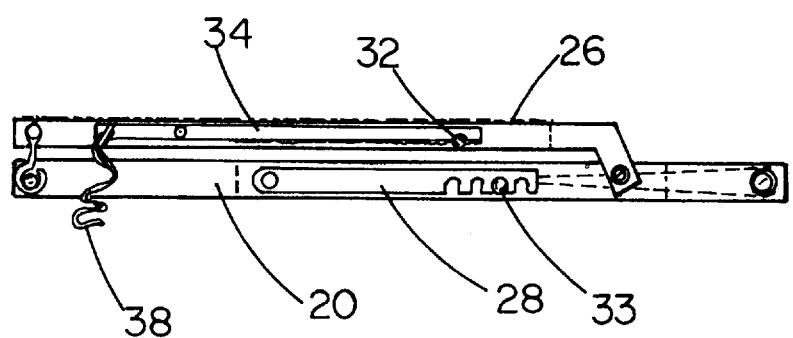
FIG. 2 is a side elevational view of the device in the collapsed orientation.
Figure 3:
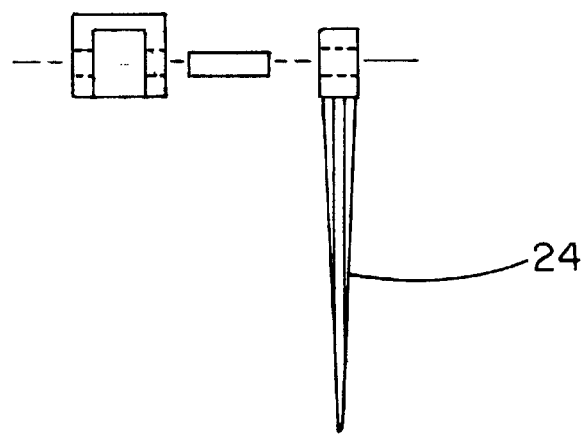
FIG. 3 is a detailed view of one of the ground stakes employed by the device.

With reference now to the drawings, and in particular to FIG. 1 thereof, the footrest and turkey call device of the present invention is depicted. In its broadest context, the present invention includes a base plate to which a footrest is pivotally secured. A pair of adjustment rods are employed in supporting the footrest. Additionally, a activation pedal is pivotally secured to the side of the footrest. the activation pedal, in turn, is interconnected to a turkey call device. The activation pedal can be rotated with the foot in order to activate the turkey call. The various components of the present invention, and the manner in which they interrelate, will be described in greater detail hereinafter.

The base 20 is defined by a rearward edge, a forward edge and an intermediate extent therebetween. Additionally, two side edges extend between the rearward and the forward edges. With reference to FIG. 1, a cutout heel portion 22 is formed at the rearward edge of the base. The cutout portion 22 is adapted to accept the heel of a user with his foot resting upon the footrest.

With continuing reference to FIG. 1, a pair of ground stakes 24 are secured to the base portion 20. More specifically, each of the stakes 24 are pivotally secured to the rearward edge of the base 20 adjacent to the cutout portion 22. The two stakes 24 are adapted to be pivoted downward and inserted in the ground to better secure the device 10 when in use.

The footrest 26 of the device is defined by a rearward edge, a forward edge and side edges which extend therebetween. The rearward edge of the footrest 26 is pivotally coupled to the rearward edge of the base. A pair of adjustment rods 28 are employed in supporting the footrest 26 at a number of different inclinations. Each of the adjustment rods 28 are pivotally coupled to an intermediate extent of a side edge of the base 20. Each of the adjustment rods 28 is adapted to engage a pin 32 located at an intermediate extent of the side edge of the footrest 26. Additionally, each of the adjustment rods 28 includes a number of recesses for accepting the corresponding pin. In this manner the angular position of the footrest 26 may be adjusted by changing the recess into which the corresponding pin is placed. Furthermore, a pin 33 is also included along the intermediate extent of each side edge of the base portion 20. Thus, when in a collapsed orientation, the adjustment rods 28 can each be pivoted into a location parallel to the side edges of the base portion 20 with the recesses of the adjustment rods engaging a pin 33 upon the side edge of the base portion 20. Similarly, when collapsed the activation pedal 34 can be pivoted into alignment with the side edge of the footrest, with the activation pedal 34 engaging the pin 32 of the footrest 26.

Figure 4:
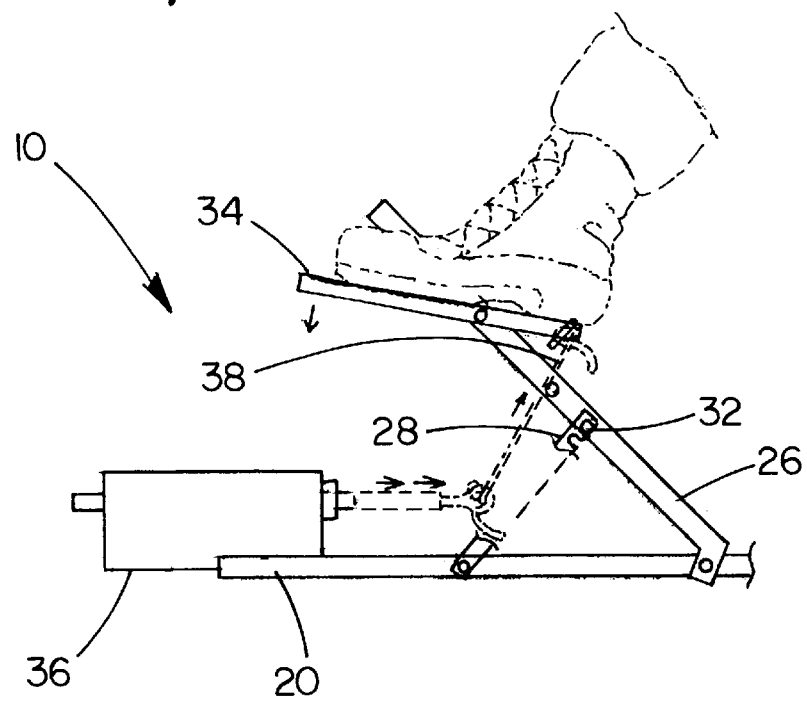
FIG. 4 is a elevational view of the device in use.

The turkey call activation pedal 34 is defined by a rearward end, a forward end and an intermediate extent therebetween. The intermediate extent of the activation pedal 34 is pivotally coupled to a side edge of the footrest 26 approximate to the forward edge, in a manner depicted in FIG. 4.

The turkey call generating device 36 is defined by a forward portion from which sound emanates, and a rearward edge with an associated activation switch for use in producing a turkey call sound. Although a turkey call device is specifically described other animal sound generating devices could be employed such as a duck call. A length of cord 38 serves to interconnect the activation switch and the rearward end of the activation pedal 34. In this manner the forward rotation of the activation pedal 34 causes the outward movement of the activation switch and the production of a turkey sound.

Thus, in use the footrest is adjusted to an appropriate inclination via the adjustment rods. The entire device can be secured to the ground by way of the two ground stakes. Thereafter the pivotal activation switch in interconnected to the switch of the turkey call by a of a length of cord. In this configuration, the device can be utilized as both a footrest and a turkey call. The foot rest and turkey call also has a collapsed configuration. This configuration is achieved by first detaching the turkey call from the activation switch. The turkey call is then removed from the base portion. Each of the adjustment rods is then removed from the footrest and positioned upon a corresponding pin upon the side edge of the base portion. The configuration is maintained in the collapsed configuration through the use of a hook and eyelet combination. More specifically, a hook is pivotally secured to a side edge of the footrest and a corresponding eyelet is positioned upon the side edge of the base portion. Once in the collapsed configuration, the hook is positioned through the eyelet to keep the foot rest and base portion in facing relation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A footrest and turkey call device comprising in combination:

a base having a rearward edge, a forward edge and an intermediate extent therebetween, two side edges extending between the rearward and the forward edges, a cutout heel portion formed at the rearward edge of the base;

a pair of ground stakes each of the stakes being pivotally secured to the rearward edge of the base;

a footrest having a rearward edge, a forward edge and side edges extending therebetween, the rearward edge of the footrest being pivotally coupled to the rearward edge of the base, a pair of adjustment rods, each of the rods being pivotally coupled to an intermediate extend of a side edge of the base, and adapted to engage a pin located at an intermediate extent of the side edge of the footrest, each of the adjustment rods including a number of recesses for accepting a corresponding pin such that the angular position of the footrest may be adjusted;

a turkey call activation pedal having a rearward end, a forward end and an intermediate extent therebetween, the intermediate extent of the activation pedal being pivotally coupled to a side edge of the footrest approximate to the forward edge;

a turkey call generating device having a forward portion from which sound emanates and a rearward edge with an associated activation switch for use in producing a turkey call sound, a length of cord interconnecting the activation switch and the rearward end of the activation pedal such that forward rotation of the activation pedal causes the outward movement of the activation switch and the production of a turkey sound.

2. A footrest and animal call device comprising in combination:

a base having a rearward edge, a forward edge and an intermediate extent therebetween, two side edges extending between the rearward and the forward edges, a cutout heel portion formed at the rearward edge of the base;

a pair of ground stakes, each of the stakes being pivotally secured to the rearward edge of the base;

a footrest having a rearward edge, a forward edge and side edges extending therebetween, the rearward edge of the footrest being pivotally coupled to the rearward edge of the base;

a call activation pedal having a rearward end, a forward end and an intermediate extent therebetween, the intermediate extent of the activation pedal being pivotally coupled to a side edge of the footrest approximate to the forward edge;

an animal call generating device having a forward portion from which sound emanates and a rearward edge with an associated activation switch for use in producing an animal sound, a length of cord interconnecting the activation switch and the rearward end of the activation pedal such that forward rotation of the activation pedal causes the outward movement of the activation switch and the production of an animal sound.

3. A footrest and animal call device comprising, in combination:

a base having a rearward edge, a forward edge and an intermediate extent therebetween, two side edges extending between the rearward and the forward edges;

a footrest having a rearward edge, a forward edge and side edges extending therebetween, the rearward edge of the footrest being pivotally coupled to the rearward edge of the base;

a call activation pedal having a rearward end, a forward end and an intermediate extent therebetween, the intermediate extent of the activation pedal being pivotally coupled to a side edge of the footrest approximate to the forward edge;

an animal call generating device having a forward portion from which sound emanates and a rearward edge with an associated activation switch for use in producing an animal sound, a length of cord interconnecting the activation switch and the rearward end of the activation pedal such that forward rotation of the activation pedal causes the outward movement of the activation switch and the production of an animal sound; and a pair of adjustment rods, each of the rods being pivotally coupled to an intermediate extent of a side edge of the base, and adapted to engage a pin located at an intermediate extent of the side edge of the footrest, each of the adjustment rods including a number of recesses for accepting a corresponding pin such that the angular position of the footrest may be adjusted.

* * * * *